(12) United States Patent
Badent et al.

(10) Patent No.: US 12,179,297 B2
(45) Date of Patent: Dec. 31, 2024

(54) SYSTEMS FOR PROCESSING ELEMENTS (71) Applicant: TOX PRESSOTECHNIK GMBH & CO. KG, Weingarten (DE)

(72) Inventors: Michael Badent, Weingarten (DE); Eberhard Dietzel, Weingarten (DE); Axel Fischbach, Ravensburg (DE); Frederik Freudling, Tettnang (DE); Patrick Kaletta, Friedrichshafen (DE)

(73) Assignee: TOX PRESSOTECHNIK GMBH & CO. KG, Weingarten (DE)

( * ) Notice: Subject to any disclaimer, the term of this patent is extended or adjusted under 35 U.S.C. 154(b) by 0 days.

(21) Appl. No.: 18/742,016

(22) Filed: Jun. 13, 2024

(65) Prior Publication Data

US 2024/0367272 A1 Nov. 7, 2024

Related U.S. Application Data

(63) Continuation of application No. PCT/EP2022/086616, filed on Dec. 19, 2022.

(30) Foreign Application Priority Data

Dec. 22, 2021 (DE) .......................... 102021134407.7

(51) Int. Cl.
*B23P 19/00* (2006.01)
*B21J 15/32* (2006.01)
(Continued)

(52) U.S. Cl.
CPC ............. *B23P 19/005* (2013.01); *B21J 15/32* (2013.01); *B23P 19/062* (2013.01); *B25J 11/005* (2013.01)

(58) Field of Classification Search
CPC ................................ B21J 15/32; B23P 19/005
See application file for complete search history.

(56) References Cited

U.S. PATENT DOCUMENTS

| 4,074,425 A | 2/1978 | Hashimoto et al. |
| 2002/0153227 A1 | 10/2002 | Broich et al. |

FOREIGN PATENT DOCUMENTS

| DE | 10 2009 023 757 A1 | 12/2010 |
| DE | 10 2013 006 315 A1 | 10/2014 |

(Continued)

OTHER PUBLICATIONS

JP 2007222924A English translation and FOR (Year: 2007).*

(Continued)

*Primary Examiner* — Jason L Vaughan
*Assistant Examiner* — Amanda Kreiling
(74) *Attorney, Agent, or Firm* — BURR PATENT LAW, PLLC (57) ABSTRACT

A system for processing elements, including a supply device, a processing device and a hollow transport line. The supply device and the processing device are connected via the hollow transfer line. The processing device processes elements, and the supply device supplies elements to the hollow transfer line so that the elements are transferred to the processing device via the hollow transfer line in order to supply the processing device with the elements. A pneumatically operated system component is provided to operate the system. The system includes a gas compressor unit for providing compressed and/or accelerated pressurised air. The gas compressor unit is in an installation space that accommodates the system. The gas compressor unit takes air in from the environment of the processing device and/or from the environment of the supply device in the installation space and provides compressed and/or accelerated pressurised air for the pneumatically operated system component.

12 Claims, 6 Drawing Sheets

(51) Int. Cl.
     *B23P 19/06*           (2006.01)
     *B25J 11/00*           (2006.01)

(56) References Cited

FOREIGN PATENT DOCUMENTS

| | | |
|---|---|---|
| DE | 10 2017 006 275 B3 | 7/2018 |
| JP | H08-001454 A | 1/1996 |
| JP | 2007-222924 A | 9/2007 |
| WO | 2014/166864 A1 | 10/2014 |

OTHER PUBLICATIONS

International Preliminary Report on Patentability (with Chapter II Claims) (Application No. PCT/EP2022/086616) dated Mar. 5, 2024 (with English translation) (29 pages).
Dehli, Martin, Energieeffizienz in Industrie, Dienstleistung und Gewerbe: Energietechnische Optimierungskonzepte für Unternehmen (translated Energy Efficiency in Industry, Services and Commerce: Energy Technology Optimization Concepts for Companies), Springer, Jan. 1, 2020 (37 pages).
German Search Report and Written Opinion (Application No. 10 2021 134 407.7) dated Aug. 17, 2022 (10 pages).
International Search Report and Written Opinion (Application No. PCT/EP2022/086616) dated Apr. 25, 2023 (15 pages).

\* cited by examiner

SYSTEMS FOR PROCESSING ELEMENTS

CROSS REFERENCE TO RELATED APPLICATIONS

This application is a continuation of International Application No. PCT/EP2022/086616 filed Dec. 19, 2022, which designated the United States, and claims the benefit under 35 USC § 119(a)-(d) of German Application No. 10 2021 134 407.7 filed Dec. 22, 2021, the entireties of which are incorporated herein by reference.

FIELD OF THE INVENTION

The present invention relates to systems for processing elements.

BACKGROUND OF THE INVENTION

Systems for processing elements are known. For example, the system has system subunits, comprising a feed device that supplies the elements, a processing device, and a hollow transport line for transporting the elements from the feed device to the processing device.

The elements, which are small components, are, for example, joining elements such as functional or connecting elements, e.g. rivets and the like. The elements are, for example, fed to the processing device or tool, wherein, for example, to collect individual elements from a stock of elements and feed in the elements in an automated manner, a pressurized gas, e.g. pressurized air, is used as a means of transport or energy carrier, e.g. for transporting the elements.

Pressurized air is used in pneumatic systems, which, for example, have a cylinder-piston unit that uses the pressurized air as an energy carrier. In industrial applications, the pressurized air is supplied centrally and fed to the different consumers at different locations of use, for example. To compress the air, use is made, in particular, of compressors, for example.

The disadvantage with many pressurized air applications is that pressurized air is inefficient as an energy carrier, and losses or energy losses in the region of up to and over 90 percent occur. This results in relatively high operating costs. Traditionally, therefore, pressurized air as an energy carrier is subject to criticism. In view of the global climate crisis, for example, pressurized air as an energy carrier is likewise criticized as being inefficient.

SUMMARY OF THE INVENTION

It is the object of the present invention to provide a system for processing elements in which the disadvantages discussed are minimized or are avoidable.

The present invention starts from a system for processing elements, comprising a feed device, a processing device and a hollow transport line, wherein the feed device and the processing device are connected to one another via the hollow transport line, wherein the processing device is designed for processing elements, wherein the feed device is designed to receive a number of elements and transfer them to the hollow transport line, wherein the elements can be transported to the processing device via the hollow transport line in order to supply the processing device with the elements, wherein a pneumatically operated system component for operating the feed device and/or for operating the processing device is provided. The system is designed, for example, as a technology system, e.g. as part of a production facility, e.g. for setting rivets or functional elements on a workpiece.

Elements that may be considered are, for example, connecting elements or joining elements such as screws and rivets, self-piercing rivets, clinch rivets and/or functional elements such as self-piercing, punch-in, press-in, stamp-in nuts and/or self-piercing, punch-in, press-in or stamp-in bolts. Thus, the feed device can be used in a versatile and flexible manner for different setting tasks. By means of the feed device, an associated processing device can be supplied with the respective elements via the transport line.

The processing device is, for example, a tool such as a setting tool or a press tool, punching tool and/or clinching tool. The processing device is, for example, a tool for clinching, riveting, self-pierce riveting and/or pressing in elements such as functional elements and other elements that can be pressed in. The processing device is designed, in particular, to receive elements, for example, to receive them from the transport line, e.g. a transport duct or a feed hose, and to further process them and attach them to a workpiece. By way of example, the elements can be pressed and/or punched, for example, into a single- or multi-layer component by means of the processing device.

The workpiece is generally positioned, e.g. fixed, using holding and/or position-defining means, e.g. clamping mechanisms. The operation and use of the means, such as the opening and release of the means or clamping mechanisms, are accomplished pneumatically, for example. Alternatively, electrically operated clamping means are possible.

The feed device, e.g. a feed appliance or a feed arrangement, is designed in such a way as to receive the elements in a delivery form, e.g. as heaped material or in heaped form or in an undefined spatial orientation, and to pass them on. The feed device is designed, in particular, to bring the elements at least substantially into a defined orientation or arrangement and to transfer them to the transport line for onward transport to the processing device.

At the core of the present invention is the fact that the system comprises a gas compressor unit for generating and supplying compressed and/or accelerated pressurized air, wherein the gas compressor unit is provided in an installation space in which the system is accommodated, wherein the gas compressor unit is designed to take in air from the environment of the processing device and/or from the environment of the feed device in the installation space and to supply compressed and/or accelerated pressurized air for the pneumatically operable system component for the operation of the system. The gas compressor unit is designed, for example, to generate a compressed and/or accelerated gas volume which forms the pressurized air. Pressurized air or gas pressure should be understood to mean a gas volume which is available in a gas space which is delimited with respect to the outside, for example. The gas volume is a static gas volume or a dynamic or moving gas volume. Pressurized air has, for example, a pressure level which is slightly higher than the surrounding or atmospheric pressure level, e.g. 10%, 20% or 30% above it, e.g. 10% to 30% above a mean pressure level of approximately 1 bar. Pressurized air also includes a gas or air volume which, for example, has a pressure level that corresponds to a multiple of the ambient pressure, e.g. 2 to 10 bar, up to a pressure level of over one hundred or up to over several hundred bar, which can be generated technically from ambient air at ambient pressure and supplied safely.

For example, the gas compressor unit is designed to take in air from the environment of the processing device and/or from the environment of the feed device in the installation space and to supply compressed and/or accelerated pressurized air for the pneumatically operable system component for the operation of the feed device and/or for the operation of the processing device.

For example, the system comprises precisely one gas compressor unit. For example, the system comprises precisely one gas compressor unit, which supplies a plurality of processing devices with pressurized air. For example, a respective system component of a processing device is supplied with pressurized air. It is possible, for example, for a plurality of system components to be supplied simultaneously with pressurized air by the precisely one gas compressor unit.

The system comprises two, three, four or five processing devices, for example. Each processing device has at least one pneumatically operable system component, for example. For example, individual or all of the pneumatically operable system components of the two, three, four or five processing devices are supplied with pressurized air by the precisely one gas compressor unit. For example, the gas compressor unit supplies precisely one pneumatically operable system component or supplies a plurality or all of the pneumatically operable system components of the system.

For example, the system comprises two, three, four or five feed devices with a pneumatically operable system component or with a plurality of pneumatically operable system components. For example, the plurality of feed devices comprises precisely one gas compressor unit or precisely two gas compressor units. For example, each of a plurality of gas compressor units has precisely one gas compressor unit. For example, each of the plurality of feed devices has precisely one gas compressor unit.

For example, the feed device comprises one gas compressor unit. For example, the processing device comprises one gas compressor unit. For example, the gas compressor unit is provided as a unit that is separate from the feed device and from the processing device. For example, the gas compressor unit is provided in the installation space separately from the feed device and from the processing device, being provided in mobile or stationary form, for example.

For example, precisely one gas compressor unit of the system supplies two processing devices of the system, three processing devices of the system, four processing devices of the system with pressurized air, or five processing devices of the system.

For example, precisely one gas compressor unit of the system supplies two or more than two pneumatically operable system components of the system with pressurized air.

For example, precisely one or precisely two or precisely three or precisely four gas compressor units is/are provided in a system. For example, the precisely one or the precisely two or precisely three or precisely four gas compressor units is/are provided in a system, e.g. as part of a feed device and/or as part of a processing device and/or as a separate gas compressor unit outside of a feed device and/or outside of a processing device.

For example, the feed device comprises a pneumatically operable system component or a plurality of pneumatically operable system components, wherein the one or more system components can be supplied with pressurized air by precisely one gas compressor unit of the system.

For example, the processing device comprises a pneumatically operable system component or a plurality of pneumatically operable system components, wherein the one or more system components can be supplied with pressurized air by precisely one gas compressor unit of the system.

For example, the processing device comprises a pneumatically operable system component, e.g. a pressurized air consumer. For example, the processing device comprises a pneumatically operable system component which is designed as a clamping system component for clamping or holding the workpiece or a plurality of workpiece layers of the workpiece.

The proposed architecture of the system comprises a decentralized in situ pressurized air supply. The proposed system forms a counter-concept to a centralized pressurized air supply. It is thereby possible to avoid the disadvantages of centrally supplied pressurized air as an energy carrier. The previous losses or energy losses of a centralized pressurized air supply are avoided or at least minimized. Moreover, the operating costs can be lowered in comparison with systems that have a centralized pressurized air supply. In the proposed system, it is possible, in particular, to minimize leakage and/or line losses by means of the spatial proximity of the gas compressor unit to the point of consumption of the pressurized air. For example, overcompression losses can be minimized, thereby making it possible to realize considerable potential savings relative to a centralized pressurized air supply.

For example, it is possible in a technically advantageous way to use different compressor principles for different requirements on the pressurized air supply for a system component, as regards the pressure level and/or the volume flow of the pressurized air supplied. As a result, it is possible to use the respective selected compressor principles in a selective way matched to the respective application.

By means of the gas compressor unit, or a gas compression unit for example, gas, to be more specific generally air from the immediate environment of the processing device and/or the feed device, is taken in in the installation space. The ambient air taken in has an ambient air pressure or atmospheric pressure, e.g. an ambient air pressure of about 1 bar.

The gas compressor unit is designed to supply the gas volume in a pre-determinable pressurized air volume and/or at a pre-determinable pressure level.

By means of the pressurized air, it is possible, for example, to transport the elements pneumatically by means of the gas volume, as in a gas flow. The pressurized air transport takes place in the transport line, and, therefore, the elements get to the processing device in the transport line.

The pressurized air for the pneumatically operable system component of the feed device is generated directly in the feed device or feed arrangement, for example, and not by some other pressurized air system. The pressurized air is supplied without the need for externally supplied pressurized air. In the system, it is possible, in particular, to dispense completely with a pressurized air supply that is, for example, centralized or that comes from outside and is connected.

Overall, it is possible with the proposed system to avoid losses, such as overcompression losses, line system losses or line system pressure losses and/or leakage losses. Monitoring or controllability of the gas compressor unit enables pressurized air to be generated in a way that is dynamic and precisely matched to demand. It is advantageously possible to specify the precise pressurized air volume and/or pressure level that is required for the pneumatically operable system component.

The system component forms a pressurized air consumer, for example.

The system has precisely one system component, for example. In general, a plurality of such system components is present in the system. The system has a plurality of pneumatically operable system components, for example. In this case, a number of different configurations is possible. For example, precisely one gas compressor unit is assigned to precisely one system component. Alternatively, or in addition, precisely one gas compressor unit is assigned to several system components. The precisely one gas compressor unit supplies precisely two or precisely three or more than three system components with pressurized air, for example.

It is also conceivable for a plurality of gas compressor units, e.g. precisely two gas compressor units, to be assigned to precisely one pneumatically operable system component. It is possible, for example, for the plurality or, for example, the precisely two gas compressor units to operate simultaneously and to simultaneously supply the precisely one associated system component with pressurized air. It is possible, for example, for only precisely one of the plurality of or of the, for example, precisely two gas compressor units to operate and supply the precisely one associated system component with pressurized air at any one time.

For example, a plurality of gas compressor units, e.g. precisely two gas compressor units, are assigned to a plurality of system components. For example, two or more gas compressor units supply two or more system components with pressurized air. A plurality of system components can be supplied simultaneously with pressurized air, using precisely one active or a plurality of active gas compressor units.

For example, precisely one gas compressor unit is provided, which supplies generated pressurized air, thus enabling elements to be transported in the transport line and/or a system component to be operated by means of the precisely one gas compressor unit. For example, a plurality of system components can be supplied with pressurized air. By means of pressurized air from the, for example, precisely one gas compressor unit, the elements can be fed to the processing device via the transport line, and the respective further system components can be supplied with pressurized air via in each case one associated further pressurized air line, for example. For example, the plurality of system components can be supplied by means of a respective pressurized air line with pressurized air from the precisely one gas compressor unit.

The gas compressor unit can be set up as a separate unit in the vicinity of the processing device or can be part of a feed device.

For example, a separate further pressurized air line between the gas compressor unit and a system component of the processing device or a system component which is situated on the processing device is provided in addition to the transport line for the pneumatic transport of elements to the processing device. The system component is a motion drive, for example. For example, the separate further pressurized air line is provided for feeding pressurized air, supplied by the precisely one gas compressor unit, to the motion drive of a processing device punch that can be movably driven. For example, the pressurized air fed in by the separate further pressurized air line is used for driving the movement of a processing device punch in a pneumohydraulic and/or pneumatic manner. For example, a separate further pressurized air line or a plurality of separate further pressurized air lines is provided between the gas compressor unit and the processing device. A pressurized air line is provided, for example, for the pneumatic operation of a system component of the processing device or a system component on the processing device.

Other modifications of these variants are also possible.

For example, a system for press-joining a material is proposed, comprising a press-joining device, wherein the press-joining device is designed for press-joining, wherein the system is provided in an installation space, wherein a pneumatically operable system component for operating the press-joining device is provided. The system comprises a gas compressor unit for generating and/or supplying a compressed and/or accelerated gas volume, wherein the gas compressor unit is provided in the installation space, wherein the gas compressor unit is designed to take in air from the environment of the press-joining device in the installation space and to supply compressed and/or accelerated pressurized air for the pneumatically operable system component for the operation of the press-joining device.

In this case, it is possible in a system comprising a press-joining device to achieve the above-explained advantages and to avoid the disadvantages discussed with systems that have a centralized pressurized air supply.

The press-joining device, e.g. a clinching tool or a press-joining tool, has, for example, a pneumatic drive, a hydropneumatic drive or a pneumohydraulic drive. The gas compressor unit is used, for example, to supply the pneumatic or hydropneumatic or pneumohydraulic drive with pressurized air.

The gas compressor unit is, for example, provided separately from or in a manner integrated on the processing device, e.g. separately from the press-joining tool or mounted thereon.

The processing device is a setting tool, clinching tool, riveting tool, self-pierce riveting tool and/or a press-in tool, for example. An electric drive, such as an electric motor, is also possible as a drive for the processing device, e.g. a setting device, or for the setting tool, clinching tool, riveting tool, self-pierce riveting tool and/or press-in tool.

The press-joining device is mounted on a robot arm of a robot and can be moved and controlled in space, for example. Alternatively, the press-joining device is positioned in a fixed manner in the installation space.

It is proposed that there be a plurality of gas compressor units. This enables the system to be set up in a variable manner, e.g. in a manner adapted to the required pressurized air volume or to the demanded pressure level of the pressurized air. In addition, the system can be adapted to the number of consumers or to the number of pneumatic system components or to the number of feed devices and/or to the number of processing devices and/or to the number of press-joining devices.

The system has precisely two, precisely three, precisely four or more than four gas compressor units, for example. Thus, it is possible to equip a system in a flexible manner, e.g. if a plurality of different or a plurality of identical system components are provided for the operation of the feed device and/or for the operation of the processing device. For example, two or more than two or all of the plurality of gas compressors are of identical design, e.g. of the same construction. For example, two or more than two or all of the plurality of gas compressors are identical in terms of the principle of operation, e.g. the principle of action. For example, two or more than two or all of the plurality of gas compressors are of identical or a different power rating.

Alternatively, the precisely one system component can be supplied simultaneously with the respective pressurized air or a respective pressurized air flow by precisely two or more than two gas compressor units.

It is not excluded that, for precisely one consumer or for precisely one pneumatic system component, precisely two gas compressor units, for example, are provided to supply the system component with pressurized air. It is possible, for example, for the precisely one system component to be supplied by only precisely one gas compressor unit of the two or more gas compressor units at any one time.

Alternatively, two or more than two or all of the plurality of gas compressors can be different in terms of the principle of action or in construction, for example. For example, two or more than two or all of the plurality of gas compressors are of a different power rating.

For example, the pneumatically operable system component for operating the processing device comprises an element filling station and/or a tool changing station. For example, the element filling station and/or the tool changing station are temporarily removed from or moved away from the processing device but situated in the same working environment. For filling with elements and changing a tool for example, the element filling station or the tool changing station can be coupled, e.g. temporarily, to the processing device.

For example, the element filling station, e.g. a riveting element filling station, is used to fill an element storage container, e.g. an element magazine on the processing device. For example, the element filling station has a plurality of elements. By means of the pressurized air supplied by the gas compressor unit, the element filling station can be operated pneumatically, e.g. via a pneumatic connection between the gas compressor unit and the element filling station. The gas compressor unit is part of the feed device, for example. Alternatively, the gas compressor unit is provided outside the feed station. For example, the elements can be transferred pneumatically from the element filling station to the processing device. In the coupled state of the element filling station and the processing device, for example, the elements can be transferred from the element filling station to an element storage device, which remains permanently on the processing device, for example. For example, a slide of the element filling station is pneumatically operated. To transfer the elements from the element filling station to the processing device or to the element storage device, the processing device is moved up to the fixed-position element filling station and is brought into a mutually coupled state and, after transfer, the processing device is moved away from the element filling station again. It is also possible, for the purpose of transferring the elements, for the element filling station to be moved up to the processing device or to the element storage device on the processing device and, after transfer, to be moved away from the processing device again.

For example, it is possible by means of the tool changing station to exchange or change a tool of the processing device for a different tool provided at the tool changing station. During this process, coupling, e.g. temporary coupling, of the tool changing station and the processing device occurs. For example, the tool is removed from the processing device and replaced by a tool on the tool changing station. In this case, the tool from the processing device is received by the tool changing station, for example. To change a tool in the coupled state by mounting a tool from the tool changing station on the processing device, wherein the previously present tool on the processing device is removed, the processing device is, for example, moved up to the tool changing station and, after transfer, is moved away again. Conversely, it is also possible, for the purpose of a tool change, to move the tool changing station up to the processing device and, after changing the tools, to move it away from the processing device again.

For example, precisely one gas compressor unit is provided, which is designed to supply a plurality of pneumatically operable system components with compressed and/or accelerated pressurized air. For example, precisely one gas compressor unit is provided, which is designed to supply a plurality of pneumatically operable system components that are of the same type or different with compressed and/or accelerated pressurized air.

For example, it is possible to use the pressurized air supplied by the gas compressor unit to operate a pneumatically operated system component on the processing device or a plurality of pneumatic system components on the processing device.

For example, it is possible to use the pressurized air supplied by the gas compressor unit to operate a pneumatically operated system component which can be coupled temporarily to the processing device or is present permanently on the processing device.

For example, the feed device comprises precisely one gas compressor unit, by means of which pressurized air for the operation of a plurality of pneumatic system components can be supplied. For example, the precisely one gas compressor unit, e.g. precisely one compressor, supplies pressurized air, wherein the pressurized air is used to operate the element filling station, the tool changing station of a pneumatic system component on the processing device, e.g. a pneumatic drive for a punch of the processing device, and/or for the pneumatic transport of elements from the feed device to the processing device via the transport line. In this case, two, three or four different system components are supplied with pressurized air by means of the precisely one gas compressor unit, for example. For example, a plurality of pneumatic components, e.g. control and/or regulating valves are present in the system for the purpose of supplying the pressurized air in a manner controlled by the control unit, for example. The pneumatic components can be operated by means of the pressurized air supplied by the gas compressor unit.

A modification is obtained by designing a gas compressor unit to supply pressurized air at different pressure levels. The different pressure levels can be provided at specified times, e.g. by means of a system control unit. For example, precisely one gas compressor unit under consideration can be adjusted by means of the control unit or by adjusting means, for example, such that the one gas compressor unit under consideration supplies the pressurized air at a respectively necessary pressure level. It is conceivable here that the gas compressor unit supplies a consumer or a system component with different pressurized air pressure levels, e.g. precisely one system component that requires a respective different pressure level of the pressurized air in a time-dependent manner. It is also conceivable for the gas compressor unit to supply pressurized air selectively to precisely one consumer of two consumers or selectively to one pneumatic system component of two system components, wherein the two system components each require a different pressure level of the pressurized air. The gas compressor unit can be connected, in a switchable manner for example, to a, for example, first system component or to a second system component, thus making it possible to supply only precisely one system component of the gas compressor unit with the respective pressurized air at the respectively appropriate pressure level at any one time. This is advantageous, for example, if only precisely one pneumatic system component of a plurality of pneumatic system components operates at any one time.

It is furthermore advantageous if two gas compressor units are provided, wherein the two gas compressor units differ in construction and/or in the principle of operation. This allows appropriate or optimum operation of the system components with a respectively necessary volume flow of the pressurized air and/or with a respective pressure level of the pressurized air.

The at least two gas compressor units have, for example, a gas compressor unit which operates according to the dynamic compressor principle. The at least two gas compressor units have, for example, a gas compressor unit which operates according to the dynamic compressor principle and comprises an axial turbocompressor.

The at least two gas compressor units have, for example, a gas compressor unit which operates according to the dynamic compressor principle and comprises a radial turbocompressor.

The at least two gas compressor units have, for example, a gas compressor unit which operates according to the positive displacement principle.

The at least two gas compressor units have, for example, a gas compressor unit which operates according to the positive displacement principle and has a rotary compressor and/or a piston compressor.

An illustrative modification of the system consists in that one gas compressor unit which operates according to the dynamic compressor principle is provided, and in that one gas compressor unit which operates according to the positive displacement principle is provided. This enables the system to be adapted flexibly to different requirements in respect of the pressure level and/or the volume flow of the pressurized air. For example, precisely one gas compressor unit based on the compressor principle and precisely one gas compressor unit based on the positive displacement principle are provided in the system.

In the case of the dynamic compressor principle, air is taken in between blades of a rapidly rotating compression rotor and accelerated to a high speed. The accelerated gas or accelerated air is then passed through a diffuser, wherein the kinetic energy of the air flow is converted into static pressure. Often, gas compressor units that operate according to the dynamic compressor principle are, for example, dynamic compressors, e.g. turbocompressors with an axial flow pattern or with a radial flow pattern.

In the case of the positive displacement principle, according to which piston compressors operate for example, air is taken into one or more compression chambers, after which the intake inlet thereof is closed, and the respective volumes of the individual compression chambers are then gradually reduced. During this process, the air is compressed in the compression chambers. Once the pressure in the compression chambers has reached the desired pressure level or the desired pressure ratio, a connection or a valve leading to the compression chambers is opened. Owing to the continuing reduction in the volume of the compression chambers, the compressed air then flows outward out of the compression chambers to the pneumatically operable system component. The air flows out of the compression chambers, e.g. into an adjoining volume, e.g. in an outlet system. The air flows outward out of the compression chambers to the system component at a corresponding pressure level.

According to one variant, the gas compressor unit is designed to supply a pressure level which is below a pressure level that is 0.3 bar above an initial pressure, or which is below a pressure level that is 0.2 bar above an initial pressure, or which is below a pressure level that is 0.1 bar above an initial pressure, wherein the gas compressor unit operates according to the positive displacement principle. The initial pressure reflects the pressure level of the induced air, for example, and is generally in the region of 1 bar or ambient air pressure.

The gas compressor unit is designed to supply a pressure level which has an absolute gas pressure of over 2 bar, e.g. 3 bar or, for example, 4 bar or, for example, 5 bar or, for example, over 6 bar. The absolute gas pressure is supplied by the compressed or accelerated pressurized air on the delivery side of the gas compressor unit, i.e. on the outlet side of the gas compressor unit. For example, the gas compressor unit is designed to feed the pressurized air to a system component that receives it temporarily but continuously. For example, the gas compressor unit is designed to feed pressurized air into a pressurized-gas storage device for receiving pressurized air. For example, the gas compressor unit is designed to feed the pressurized-gas storage device, such that a specifiable pressure level of the gas, e.g. air, contained in the pressurized-gas storage device prevails in the device.

The gas compressor unit that operates according to the positive displacement principle comprises a rotary compressor and/or a piston compressor, for example.

One modification is distinguished by the fact that the gas compressor unit is adapted to supply a system component arranged downstream of the gas compressor unit with a maximum system pressure level.

For example, the gas compressor unit is adapted to supply a system component situated downstream of the gas compressor unit, such as a pressurized air consumer, with a maximum system pressure level, wherein the pressure level generated by the gas compressor unit is no more than 10% higher than a pressure level actually required by the system component. This allows a high operational reliability.

For example, the gas compressor unit is adapted to supply a system component situated downstream of the gas compressor unit, such as a pressurized air consumer, with a maximum system pressure level, wherein the pressure level generated by the gas compressor unit is no more than 20% higher than a pressure level actually required by the system component.

For example, the gas compressor unit is adapted to supply a system component situated downstream of the gas compressor unit, such as a pressurized air consumer, with a maximum system pressure level, wherein the pressure level generated by the gas compressor unit is no more than 30% higher than a pressure level actually required by the system component.

For example, the gas compressor unit is matched to the system component, such as a pressurized air consumer, connected directly downstream of the gas compressor unit, wherein the directly downstream system component or the pressurized air consumer connected directly downstream affects the maximum system pressure level for all the system components or pressurized air consumers present in the system. Thus, the generated or provided pressure level of the pressurized air is no more than 10% or 20% or 30% higher than a demand, e.g. a maximum pressure level required by a system component of the system.

For example, the gas compressor unit is adapted to supply a system component situated downstream of the gas compressor unit with a maximum system pressure level, wherein the pressure level can be adapted in a dynamically flexible manner during operation, e.g. to a varying required pressure level.

According to one illustrative variant, the gas compressor unit is provided as a separate subunit of the system. This allows variable supply to the system components or to the consumers of pressurized air in the system. A subunit may be of mobile design, for example, being capable of being moved manually by a person and/or by means of a motorized motion drive, for example. A subunit is designed as a separate structural unit, for example. The subunit can be moved in space, e.g. in the installation space, by means of a housing and/or by means of a platform comprising rollers or the like. The subunit can be moved to various possible positions, e.g. points of use in the installation space, and positioned there. To connect the subunit to a system component that can be supplied with pressurized air, there is, for example, a pressurized air line between the gas compressor unit of the subunit and the consumer or system component. The pressurized air line is used to pass the compressed and/or accelerated air or pressurized air from a delivery side of the gas compressor unit, for example, to a pressurized air inlet of the system component, for example.

In the case of a plurality of gas compressor units belonging to the system or in the case of a plurality of gas compressor units present in the system, each individual gas compressor unit is designed as a separate subunit, for example. Alternatively, or in addition, precisely two or more than two gas compressor units are accommodated in one subunit. The precisely two or more than two gas compressor units in precisely one subunit are identical, for example. The precisely two or more than two gas compressor units in precisely one subunit differ from one another, for example. For example, the different gas compressor units differ in at least one feature, e.g. in construction, size, power rating and/or principle of operation. In the case of more than two gas compressor units, at least two of the plurality of gas compressor units differ from one another.

In precisely one subunit, there is at least one gas compressor unit which operates according to the dynamic compression principle, for example, and at least one further gas compressor unit which operates according to the positive displacement principle or positive displacement compression. One subunit has a piston compressor and additionally an axial and/or a radial compressor, for example.

The subunit has, in a simple configuration for example, a blower unit or a compressed air pump, which can be operated by means of an electric drive, for example.

The operational settings of each gas compressor unit can be adjusted or specified, for example, by means of adjusting means or a control unit, e.g. in each case separately or independently of another gas compressor unit. Each gas compressor unit has, for example, preferably a dedicated associated pressurized air connection, e.g. for connection to a pressurized air line connected on the delivery side, e.g. a pressurized air hose.

For example, the feed device has a gas compressor unit. The gas compressor unit is, for example, an integral part of the feed device or can be connected thereto. For example, the connectable part or the gas compressor unit is connected to the feed device via a line connection for a pressurized air line. The pressurized air line connects the gas compressor unit and the feed device so as to carry pressurized air.

For example, the feed device has a gas compressor unit which is designed as a gas flow generating device, for example. The gas compressor unit operates according to the dynamic positive displacement principle, for example. The feed device has an axial compressor and/or a radial compressor, for example.

The feed device has a storage container for accommodating a plurality of elements, for example. The feed device has, for example, a hollow line section through which the elements can be moved from an elements transfer point, at which the elements can be introduced into the line section, to a connection point of the feed device, wherein the feed device is designed as a separately positionable peripheral unit for supplying a processing device with elements. The elements that can be moved in the line section can be discharged from the feed device via the connection point. The connection point is designed for connection, in particular, gastight connection, of the line section to a hollow transport line that can be connected to the feed device. In the connected state of the line section and of the transport line, the elements can be transported in the hollow transport line from the connection point to the processing device at a distance from the feed device. The elements can be transported to the connection point by means of a gas flow in the line section. The feed device preferably has the gas compressor unit in such a way that the gas flow in the line section can be supplied in such a way that the elements can be moved from the elements transfer point, through the line section, to the connection point on account of the gas flow. The elements can be transported from the connection point out of the line section on account of the gas flow supplied by means of the gas compressor unit. The feed device is situated in an installation space, for example. The gas compressor unit is situated in the installation space in which the system is accommodated. The gas compressor unit is designed to take in air from the environment of the feed device in the installation space of the feed device in order to supply compressed and/or accelerated pressurized air. The pressurized air is used to provide the gas flow, for example. The compressed and/or accelerated pressurized air is used to operate the feed device and/or the processing device.

For example, the processing device has a gas compressor unit. The gas compressor unit is, for example, an integral part of the processing device or can be connected thereto.

For example, the connectable part or the gas compressor unit is connected to the processing device via a line connection for a pressurized air line. The pressurized air line connects the gas compressor unit and the processing device so as to carry pressurized air.

According to one modification, the gas compressor unit has an electric drive. A proven method of driving the gas compressor unit is thereby possible. The electric drive comprises an electric motor, for example.

The gas compressor unit has an electric drive, for example, wherein means are provided which supply the electric drive with a proportion of the excess energy from another system subunit of the system. It is thereby possible to provide an energy-efficient system. The excess energy is, for example, at least a proportion of a quantity of energy from a further system subunit of the system. The further system subunit of the system is, for example, another plant component of the system and/or another process step of a process within the system. The excess energy is, for example, at least a proportion of a quantity of energy in the form of energy from another plant component of the system and/or another process step of a process within the system.

The gas compressor unit has a mechanical drive, for example. This represents a robust and simple drive variant.

According to another variant, the gas compressor unit has a mechanical drive, wherein means are provided which pick off a proportion of a movement of another system subunit of the system to mechanically drive the gas compressor unit. This is particularly energy-efficient.

BRIEF DESCRIPTION OF THE DRAWINGS

Further features and advantages are explained in greater detail with reference to the exemplary embodiments illustrated schematically in the figures.

DETAILED DESCRIPTION OF THE INVENTION

In some cases, the same reference signs are used below for essentially corresponding elements of different exemplary embodiments.

Figure 1:
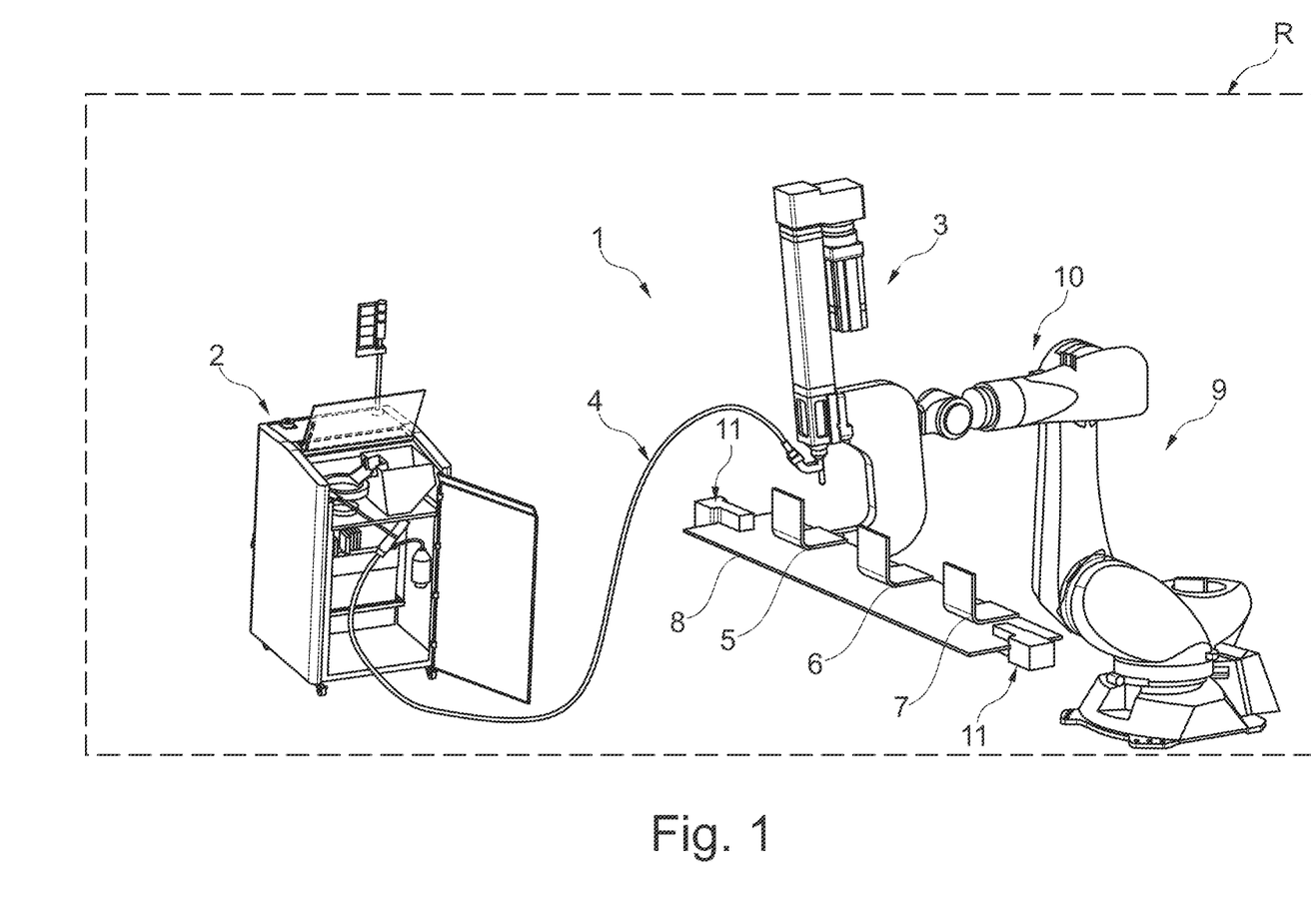
FIG. 1 shows a schematically illustrated system for processing elements, comprising a feed device, a processing device and a transport line.

FIG. 1 shows a system 1 for processing elements (not illustrated in FIGS. 1-3) in a perspective view. The system 1 comprises a feed device 2, a processing device 3, and a hollow transport line 4. The transport line 4 is designed as a hollow flexible feed hose, for example. The transport line 4 is connected or attached at one end 4b, via a line connection 3a of the processing device 3, to the processing device 3. The processing device 3 is designed for processing the elements. The feed device 2 serves to receive a plurality of elements and to transfer the elements to the transport line 4.

The system 1 is used to act on or process workpieces 5, 6, 7 and 8 present at a fixed point in a processing station 11. The action on the workpieces 5-8 in order to attach an element at a joining location is performed by means of the processing device 3 for processing the elements or, for example, for setting an element on the respective workpiece 5-8 at the joining location. For example, the angular workpieces 5-7 are each riveted to workpiece 8, which is designed as a flat sheet metal layer. Workpieces 5-7 are positioned at regular intervals on an upper side of workpiece 8. According to FIG. 1, the processing device 3 is situated in the region of workpiece 5.

The processing device 3 is connected to a robot 9 or mounted on a movable robot arm 10 of the robot 9. The robot 9 is used for the operation and spatial movement of the processing device 3 in order, for example, to attach the elements to workpieces 5-8.

The processing device 3, which is designed as a rivet processing device, for example, has a hydropneumatic or pneumohydraulic drive 15 and a C-bracket 12 with two limbs, for example. A punch unit 13 is mounted on one limb of the C-bracket 12, and a die unit 14 of the processing device 3 is mounted on the other limb (see FIG. 2).

The system 1, together with the robot 9 and the processing station 11 with workpieces 5-8, is positioned in an installation space R. The installation space R, which occupies part of a production shop, for example, is indicated schematically by a dashed border in FIG. 1.

Figure 2:
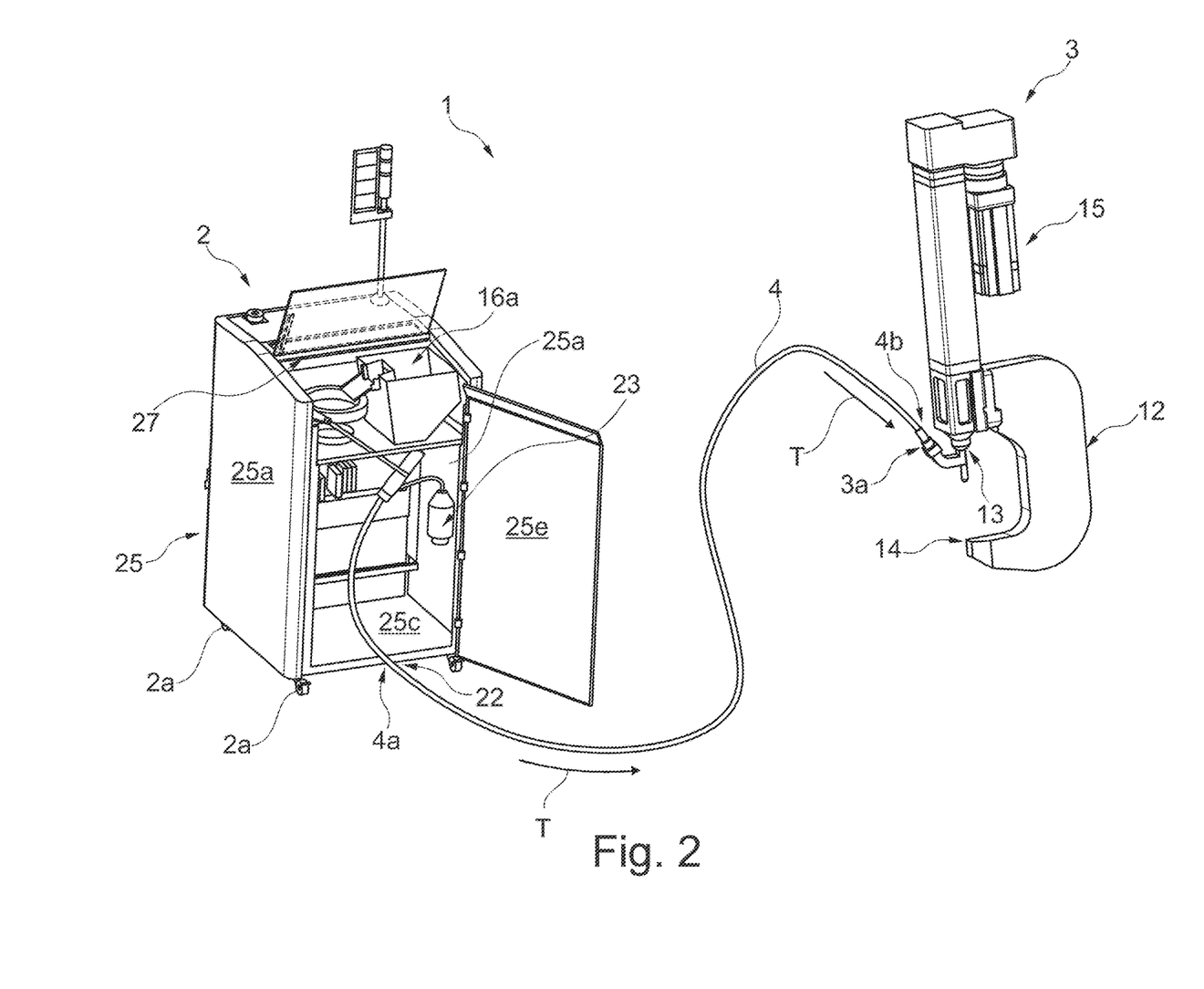
FIG. 2 shows the arrangement according to FIG. 1 without workpieces and without the robot.

FIG. 2 shows the system 1 without workpieces 5-8 and without the robot.

The feed device 2 and the processing device 3 are connected to one another via the hollow transport line 4. The elements are transported in transport direction T from the feed device 2 to the processing device 3 by a gas flow within the transport line 4, which is, in particular, gastight. The elements arriving at the processing device 3 are carried onward in corresponding line sections of the processing device 3 and are set at the respective joining location of workpieces 5-8 by means of the punch unit 13. The processing device 3 is used to set rivets, such as self-piercing rivets, clinch rivets or functional elements on workpieces 5-8, for example.

The feed device 2 is designed as a peripheral unit separate from the processing device 3, e.g. with bottom rollers 2a to enable the processing device 3 to be driven on a firm underlying surface.

The feed device 2 has a storage container 16 with a receiving volume 16a for the presentation or reception of a plurality of elements (not illustrated). The storage container 16 is connected to a sorting pot 18 via a hollow tube-like intermediate piece 17 to enable the elements to pass through individually. In the sorting pot 18, the elements arriving from the intermediate piece 17 are positioned individually in the correct position and transferred to a buffer line 19 connected to the sorting pot 18. In the buffer line 19, the elements are presented one behind the other in a row in each case in the same orientation. From the buffer line 19, the elements progress downward to a separating device 20 for the elements.

From the separating device 20, the elements pass individually into a hollow line section 21 of the feed device 2. Through the line section 21, the elements pass to a connection point 22 of the feed device 2.

At the connection point 22, the elements can be discharged from the feed device 2. At the connection point 22, the line section 21 is connected, e.g. in a gastight manner, to one end 4a of the transport line 4. In the exemplary embodiment shown, the line section 21 and the transport line 4 are formed integrally with one another or connected integrally to one another. By way of example, the line section 21 and the transport line 4 are formed by a continuous piece as a feed hose.

The elements can be transported from the connection point 22 to the processing device 3 situated at a distance from the feed device 2 with the aid or by means of a gas flow G in the line section 21 and in the transport line 4. The elements are, for example, taken along individually in the region of the separating device 20 and transported in the direction of the connection point 22 by the gas flow G prevailing in the line section 21 (see FIG. 3). The gas flow continues in the transport line 4, with the result that the elements are moved from the line section 21 into the transport line 4. Owing to the gas flow G in the transport line, the elements are transported with little friction in the transport line 4 as far as an end 4b of the transport line 4. The end 4b of the transport line 4 extends as far as the line connection 3a on the processing device 3, e.g. in the region of the punch unit 13. The end 4b of the transport line 4 is connected to the line connection 3a on the punch unit 13, through which the elements enter a punch channel of the punch unit 13 individually and in the correct position, being blown in with the aid of the gas flow G, for example.

The system 1 has a pneumatically operated system component. Here, the pneumatically operated system component is used, for example, to operate the feed device, e.g. is a part of the feed device 2.

Figure 3:
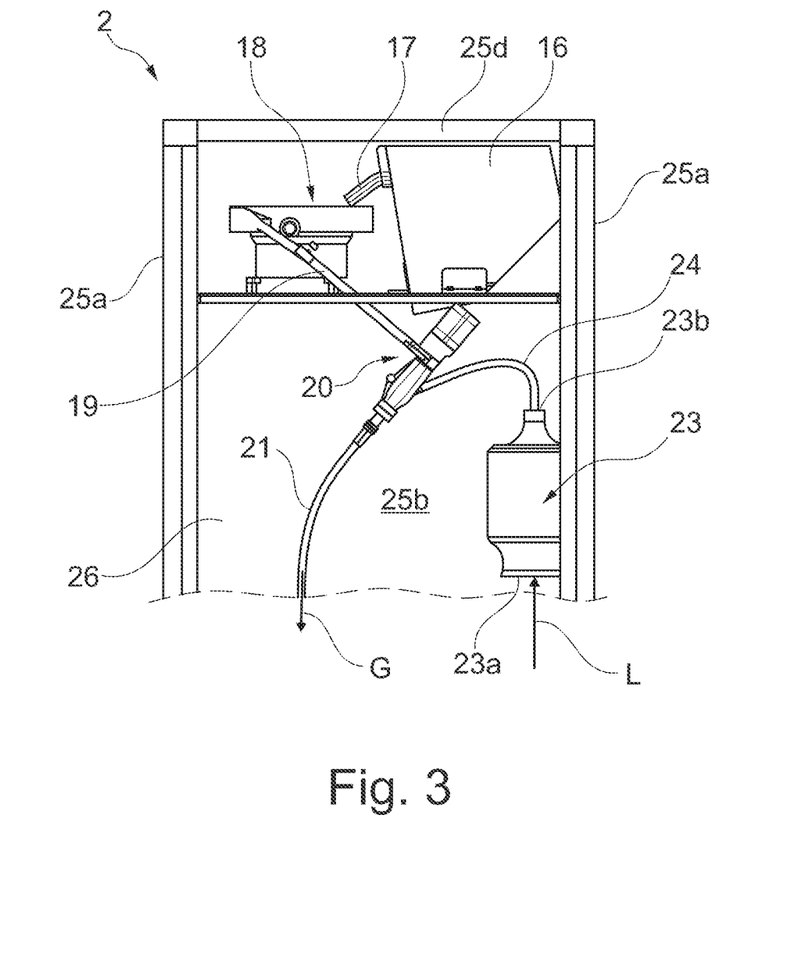
FIG. 3 shows an upper segment of the feed device from FIGS. 1 and 2 in front view without a front-side device door.

The system 1 comprises a gas compressor unit 23 for generating and supplying compressed and/or accelerated pressurized air. For example, the gas compressor unit 23 is designed as a gas flow generating device in order to provide the gas flow G. To provide the gas flow G in the line section 21 and further in the transport line 4, the feed device 2 has the gas compressor unit 23. The gas compressor unit 23 is, for example, provided exclusively for the feed device 2, for the purpose of delivering the elements by means of the gas flow G. Via a suction side 23*a* of the gas compressor unit 23, which is open to the environment or atmosphere, atmospheric air L is taken in from the environment and compressed and/or accelerated in the gas compressor unit 23. The gas compressor unit 23 is, for example, capable of being operated electrically by means of an integrated drive motor or electric motor. A delivery side 23*b* of the gas compressor unit 23 is connected to the separating device 20 via a pressurized-air-carrying connecting line 24, for example. In this case, the pressurized-air gas flow enters the region of the line section 21 which is connected to the separating device 20. The gas flow gives rise to a suction or entrainment force on an isolated element on a discharge side of the separating device 20. In this case, the incoming pressurized air flows across into the line section 21 and entrains an individual isolated element that is furthest forward in the separating device 20, for example, and carries it forward into the line section 21. The separating device 20 separates the element that is furthest forward toward the separating device 20 from a series of elements waiting in the buffer line 19 on the separating device 20.

When the gas compressor unit 23 is active, the elements successively separated by the separating device can be moved through the line section 21 to the connection point 22 by means of the gas flow.

In the connected state of the line section 21 and transport line 4, the elements can be transported from the connection point 22 out of the line section 21 and onward in the transport line 4 as far as the processing device 3 by means of the gas flow.

The gas compressor unit 23 is designed to take in air L from the environment of the feed device 2 on the suction side 23*a* of the gas compressor unit 23 in order to provide the gas flow.

The gas compressor unit 23 is designed to take in air at atmospheric pressure from the environment of the feed device 2, i.e. some of the air in the installation space R of the feed device 2, on the suction side 23*a* of the gas compressor unit 23 in order to provide the gas flow. The suction side 23*a* is, for example, within a housing 25 of the feed device 2 or in an interior space 26, surrounded by the housing 25, of the feed device 2, wherein the interior space 26 is open to the environment or connected to the air space in the installation space R. Alternatively, or in addition, the suction side 23*a* is, for example, open to the air space in the installation space R outside the housing 25 of the feed device 2. The gas compressor unit 23 has an air flow generator, for example.

The box-type housing 25 has side walls 25*a*, a rear wall 25*b*, a base 25*c*, an upper side 25*d* and a pivotable door 25*e*. The upper side 25*d* is open to the environment by means of an opened pivotable flap, this being shown in FIGS. 1 and 2, ensuring that sufficient ambient air always reaches the suction side 23*a* of the gas compressor unit 23 during the operation of the gas compressor unit 23. Electric cabling, for example, for supplying the feed device 2 with electrical energy is not shown. The feed device 2 does not have a supply interface for a decentralized supply of pressurized air to the feed device 2, for example. Accordingly, the feed device 2 does not, for example, have a pressurized air connection or a pressurized air inlet for feeding in pressurized air supplied externally or in a centralized way with respect to the system 1.

The gas compressor unit 23 comprises, for example, a gas compression unit for the gas flow generated on the suction side in the line section 21. The gas flow can be supplied by compressed and/or accelerated air by means of the gas compressor unit 23, this being possible in various ways. For example, the gas compressor unit 23 has a pressurized air compression unit. For example, the gas compressor unit 23 operates according to the turbocompressor principle with a radial compressor and/or axial compressor, e.g. with a multistage radial compressor and/or with a multistage axial compressor.

A higher-level control unit 27 (not illustrated specifically) of the feed device 2 has a computer control system or software and a processing and storage unit and serves to control the operation of the feed device 2. The control unit 27 serves, in particular, to control a specifiable or adaptable and/or adjustable power level of the gas compressor unit 23. By means of the control unit 27, it is possible, for example, to specify and/or vary the compression of the pressurized air, the generation of pressurized air and the air output that can be supplied by this means. The air output that can be supplied can be adapted, e.g. dynamically adapted, by means of the control unit 27, in particular, to an actual, e.g. respectively instantaneously required, air demand. The actual air demand is, in particular, programmable and/or can be adapted to the actual demand, e.g. dynamically, e.g. on the basis of the sensor values acquired by sensor means (not shown). Acquired sensor values relate, for example, to a speed of the delivered elements in the line section 21 and/or the transport line 4. By means of the control unit 27, adaptation of the speed of the delivered elements to a target or setpoint value stored in software is possible, e.g. on the basis of the sensor-acquired speed of the delivered elements in the line section 21 and/or the transport line 4.

The sensor mechanisms of the feed device 2 are provided for acquiring and making available the sensor values, e.g. for making available sensor values for further processing by the control unit 27.

An alternative (not shown) of the system 1 is distinguished by the presence on the processing device 3, e.g. directly on the processing device, of a feed device having the components corresponding to feed device 2 but, for example, without a housing 25. Alternatively, a feed device having the functions or components corresponding to feed device 2 is provided on the robot 9, for example. On the robot 9 there is, for example, magazine capacity for the elements in the form of the storage container and/or, in addition, a sorting pot and/or a buffer line. For a system designed as a technology system, precisely one feed device or precisely two or more than two feed devices, are provided, for example. For example, it is also possible, in an alternative system, for at least one component as in feed device 2 to be provided on the processing device 3 and for at least one other component as in feed device 2 to be provided on the robot 9.

In an alternative system or technology system, provision is made, for example, for the means of delivering the elements to be provided on the processing device 3 and/or on the robot 9 in order to deliver the elements from a conveying device to a filling station of the processing device.

In an alternative system or technology system, provision is made, for example, to deliver the elements from a magazine provided on the processing device in order to hold a multiplicity of elements ready at a processing point of the processing device. The processing point of the processing device comprises, for example, a setting head of the processing device, comprising the punch unit and the die unit.

In the case of a multi-track overall system with, for example, systems as per system 1 operating in parallel, provision can be made, for example, for the respective track to be designed in accordance with the system 1 described above.

Another alternative of a system is distinguished by the fact that a standard compressor or, for example, a commercially available known compressor, is provided in the feed device 2 and/or on the processing device 3 and/or on the robot 9. The compressor operates, for example, according to the positive displacement principle and is implemented, for example, as a piston or screw compressor.

Figure 4:
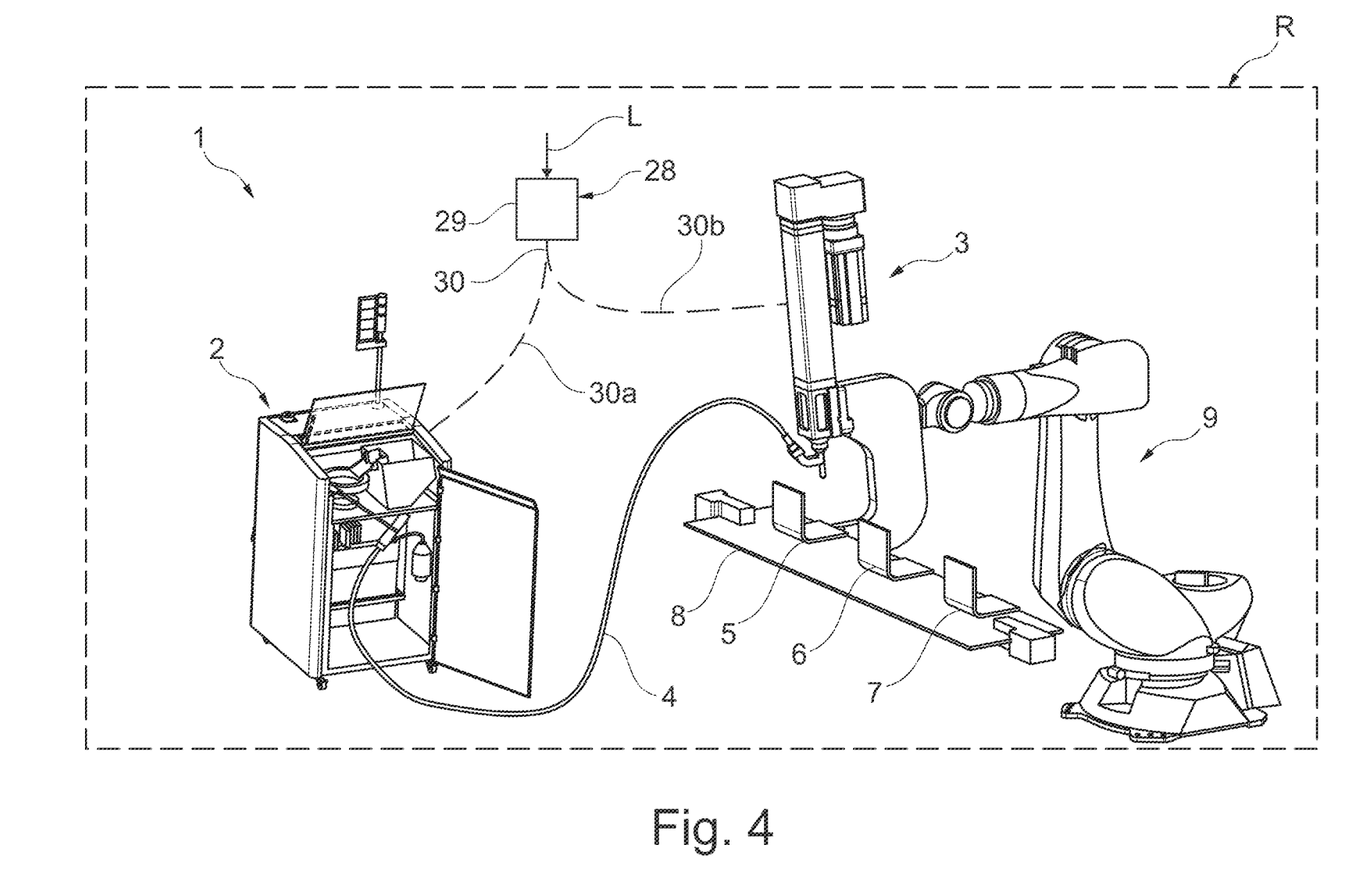
FIG. 4 shows an alternative system.

FIG. 4 differs from the system 1 shown in FIG. 1 in that the feed device 2 does not have an integral gas compressor unit. On the contrary, the system 1 has a gas compressor unit 29 provided as a separate subunit 28, which is indicated in a highly schematized form. During the operation of the gas compressor unit 29, the unit takes in air L from the installation space R on the suction side of the gas compressor unit 29 and supplies compressed and/or accelerated pressurized air on the delivery side. The pressurized air leaves the gas compressor unit 29 on the delivery side of the gas compressor unit 29, e.g. in the form of a gas flow. From the gas compressor unit 29, the pressurized air flows into a gastight outflow line 30 connected to the gas compressor unit 29 on the delivery side. The outflow line 30 is divided and opens into a line section 30a and a line section 30b.

Via valves (not illustrated), for example, in the outflow line 30 and/or in line section 30a and/or in line section 30b, the pressurized air in the outflow line 30 flows into line section 30a and/or into line section 30b.

Via the line section 30a connected to the feed device 2, a pneumatically operated system component (not designated) of the feed device 2 can be supplied with pressurized air.

Via the line section 30b connected to the processing device 3, a pneumatically operated system component (not designated) of the processing device 3 can be supplied with pressurized air.

Figure 5:
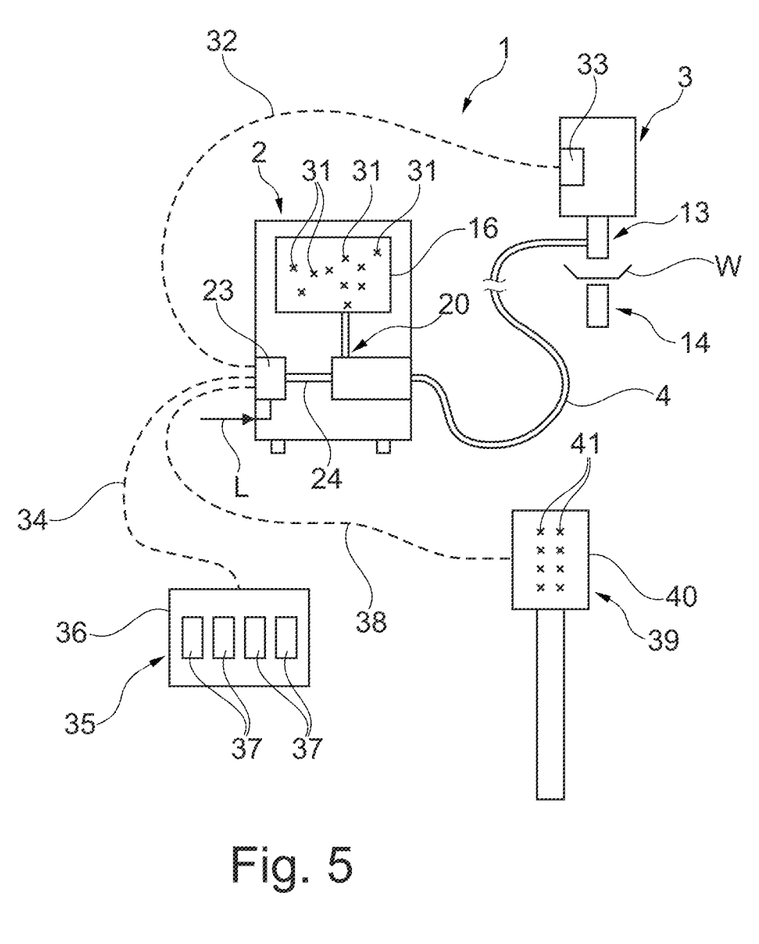
FIG. 5 shows another alternative system in highly schematized form.

FIG. 5 shows an alternative system 1 with a decentralized pressurized air supply in a highly schematized form. The system 1 comprises a feed device 2, a processing device 3 and a transport line 4. On the processing device 3, between a punch unit 13 and a die unit 14, there is a workpiece W, e.g. a sheet-metal workpiece, into which an element 31 can be pressed, this being illustrated in highly schematic form.

The feed device 2 comprises precisely one gas compressor unit 23, e.g. precisely one compressor. The gas compressor unit 23 can be operated electrically or comprises an electric motor, for example. By means of the gas compressor unit 23, air L can be taken in from the environment of the feed device 2 on the suction side of the gas compressor unit 23. During the operation of the gas compressor unit 23, pressurized air at a pressure, for example, of 3 to 6 bar is supplied on the delivery side for pneumatic operation of system components.

By means of a separating device 20, elements 31, a number of which are held in a storage container 16 of the feed device 2, are separated. Via the hollow transport line 4, which is supplied with pressurized air by the gas compressor unit 23 via a connecting line 24, individual elements are each successively fed to the processing device 3 from the separating device 20, being delivered pneumatically.

In addition, a system component 33 of the processing device 3 is supplied with pressurized air, made available by the gas compressor unit 23, via a hollow pressurized air line 32, which is formed on the delivery side between the gas compressor unit 23 and the processing device 3. The system component 33 can be operated pneumatically. For example, the system component 33 is a motion drive for pneumatically or pneumohydraulically driving a linear-motion punch of the processing device 3 or, for example, a locking member for mechanically locking a movable component. The system component 33 is supplied with pressurized air via the hollow pressurized air line 32, which is gastight with respect to the outside.

A system component 35 of the processing device 3 is supplied with pressurized air, made available by the gas compressor unit 23, via a further hollow pressurized air line 34, which is situated on the delivery side between the gas compressor unit 23 and the system component 35. The system component 35 comprises a tool changing station 36 with, for example, four tools 37 arranged releasably and in the correct position on the tool changing station 36. The tools 37 can each be exchanged individually for a tool on the processing device 3, e.g. for a tool of a punch unit of the processing device 3, this being accomplished pneumatically by means of the pressurized air supplied via the pressurized air line 34.

A system component 39 of the processing device 3 is supplied with pressurized air, made available by the gas compressor unit 23, via a further hollow pressurized air line 38, which is situated on the delivery side between the gas compressor unit 23 and the system component 39. The system component 39 comprises a storage container 40, in which a plurality of elements 41, e.g. rivets or functional elements, are held. For example, the storage container 40 is designed as a magazine or element magazine, in the internal volume of which the elements 41 are accommodated and can be introduced from outside. The elements 41 can be swapped pneumatically into a magazine (not illustrated in FIG. 5) for receiving a number of elements 41 on the processing device 3, this being accomplished pneumatically by means of the pressurized air supplied via the pressurized air line 38. To fill the magazine for receiving elements 41, for example, the processing device 3 is driven, e.g. by a robot on which the processing device 3 is mounted and can be moved in space, up to the storage container 40 filled with elements 41. The pneumatic transfer of the elements 41 then takes place, and, following this, the processing device 3 moves away from the system component 39 again.

Figure 6:
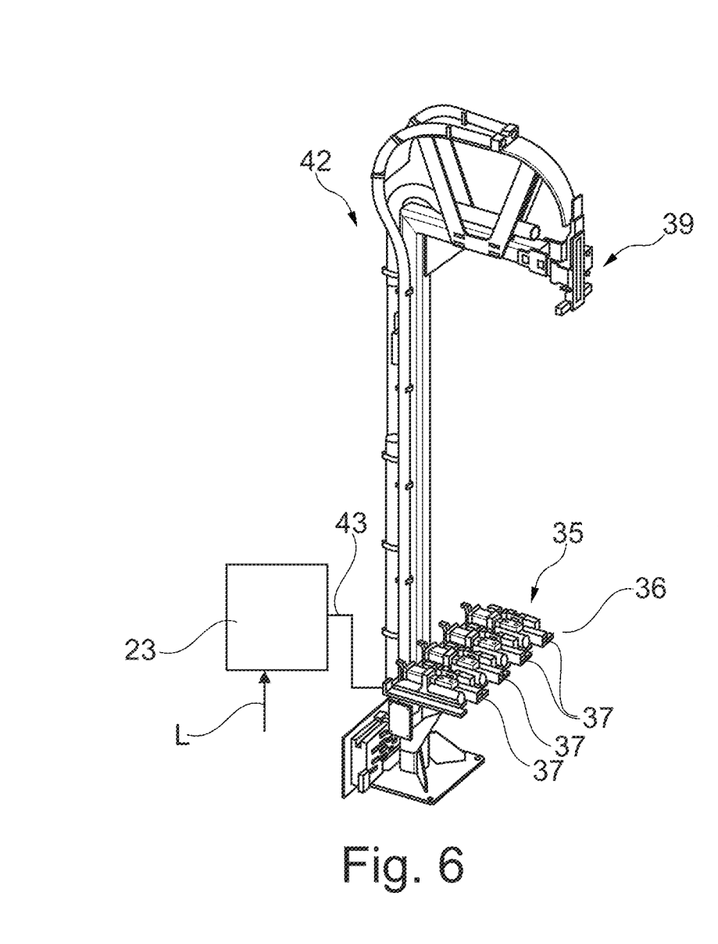
FIG. 6 shows another system illustrated partially in a schematic way.

FIG. 6 shows an arrangement with precisely one gas compressor unit 23 for the decentralized supply of pressurized air for a system component 35 and for a further system component 39. The gas compressor unit 23 according to FIG. 6 is a compressor, for example. The system components 35 and 39 are mounted on a common boom 42. The gas compressor unit 23 takes in air L from the environment of the gas compressor unit 23 and compresses it to 3 to 6 bar, for example. Via a pressurized air line 43, the pressurized air is delivered to the boom 42 and onward to system component 35 and/or system component 39.

The gas compressor unit 23 can be set up as a separate unit in the vicinity of the processing device or can be part of a feed device 2.

Figure 7:
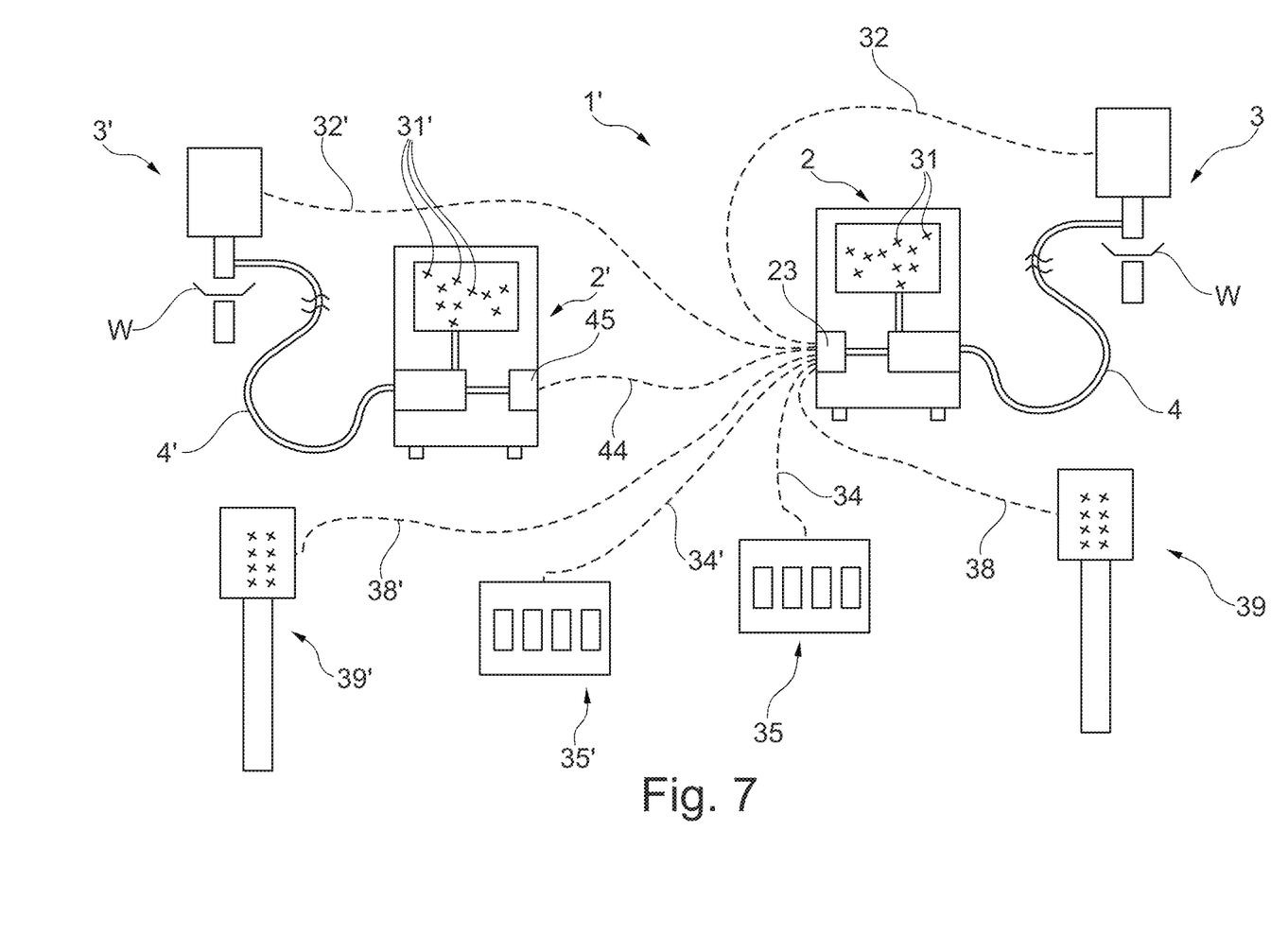
FIG. 7 shows another schematically illustrated system.

Finally, FIG. 7 shows an alternative system 1' with a decentralized pressurized air supply in a highly schematized form. The system 1' shown in FIG. 7 comprises precisely one gas compressor unit 23. In other respects, the system 1' comprises twice as many components as the system 1 shown in FIG. 5.

The system 1' comprises a first feed device 2, a second feed device 2', a first processing device 3 with a workpiece W, and a second processing device 3' with a workpiece W. There is a first transport line 4 between the first feed device 2 and the first processing device 3.

There is a second transport line 4' between the second feed device 2' and the second processing device 3'.

The system 1' comprises a gas compressor unit 23. For example, the precisely one gas compressor unit 23 is part of the feed device 2, the gas compressor unit 23 being a compressor, for example. The gas compressor unit 23 takes in air L from the environment of the feed device 2 and supplies a plurality of, e.g. all, pneumatic system components of the system 1'.

During the operation of the gas compressor unit 23, pressurized air at a pressure, for example, of 3 to 6 bar is supplied on the delivery side for pneumatic operation of pneumatically operable system components 35, 39, 35' and 39'. For example, the system components 35 and 39 are system components of the processing device 3. For example, the system components 35' and 39' are system components of the processing device 3'. The gas compressor unit 23 furthermore supplies pressurized air for transporting elements 31 from the feed device 2 to the processing device 3. The gas compressor unit 23 furthermore supplies pressurized air for transporting elements 31' from the feed device 2' to the processing device 3'.

For this purpose, pressurized air lines 32, 34, 38, 32', 34' and 38' are provided.

Via a pressurized air line 44, the gas compressor unit 23 is connected to a pressurized air accumulator 45 of the feed device 2'. Thus, pressurized air supplied by the gas compressor unit 23 is delivered into the pressurized air accumulator 45 and made available there to feed the separated elements 31' to the processing device 3' via the transport line 4'.

Alternatively, it is also possible, for example, for the pressurized air accumulator 45 of the feed device 2' to be omitted. For example, the pressurized air accumulator 45 may not be part of the feed device 2', but may be situated at some other point in the system 1'.

In addition to the gas compressor unit 23, for example, precisely one further gas compressor unit or a further number of gas compressor units may be provided, for example, e.g. as part of the feed device 2' and/or as a separate gas compressor unit 23 outside the feed device 2 and/or 2' or outside the processing devices 3, 3' and/or as part of at least one of the processing devices 3, 3'.

LIST OF REFERENCE SIGNS 1, 1' system
2, 2' feed device
2a roller
3, 3' processing device
3a line connection
4, 4' transport line
4a, 4b end
5-8 workpiece
9 robot
10 robot arm
11 processing station
12 C-bracket
13 punch unit
14 die unit
15 drive
16 storage container
16a receiving volume
17 intermediate piece
18 sorting pot
19 buffer line
20 separating device
21 line section
22 connection point
23 gas compressor unit
23a suction side
23b delivery side
24 connecting line
25 housing
25a side wall
25b rear wall
25c base
25d upper side
25e door
26 interior space
27 control unit
28 subunit
29 gas compressor unit
30 outflow line
30a, 30b line section
31, 31' element
32, 32' pressurized air line
33 system component
34, 34' pressurized air line
35, 35' system component
36 tool changing station
37 tool
38, 38' pressurized air line
39, 39' system component
40 storage container
41 element
42 boom
43 pressurized air line
44 pressurized air line
45 pressurized air accumulator

The invention claimed is:

1. A system for processing elements, wherein the elements are connecting elements, joining elements such as screws and rivets, self-piercing rivets, clinch rivets and/or functional elements such as self-piercing, punch-in, press-in, stamp-in nuts and/or self-piercing, punch-in, press-in or stamp-in bolts, comprising a feed device, a processing device and a hollow transport line, wherein the feed device and the processing device are connected to one another via the hollow transport line, wherein the processing device is designed for processing elements, wherein the feed device is designed to receive a plurality of elements and transfer them to the hollow transport line, wherein the elements can be transported to the processing device via the hollow transport line in order to supply the processing device with the elements, wherein a pneumatically operable system component for operating the system is provided, wherein the system comprises a gas compressor unit for generating and supplying compressed and/or accelerated pressurized air, wherein the gas compressor unit is provided in an installation space in which the system is accommodated, wherein the gas compressor unit is designed to take in air from the environment of the processing device and/or from the environment of the feed device in the installation space and to supply compressed and/or accelerated pressurized air for the pneumatically operable system component for the operation of the feed device and for the operation of the processing device, wherein at least two gas compressor units are provided, wherein the two gas compressor units differ in construction and/or in the principle of operation.

2. A system for press-joining a material, comprising a press-joining device, wherein the press-joining device is designed for press-joining, wherein the system is provided in an installation space, wherein a pneumatically operable system component for operating the press-joining device is provided, wherein the system comprises a gas compressor unit for generating and supplying a compressed and/or accelerated gas volume, wherein the gas compressor unit is provided in the installation space, wherein the gas compressor unit is designed to take in air from the environment of the press-joining device in the installation space and to supply compressed and/or accelerated pressurized air for the pneumatically operable system component for the operation of the press-joining device, wherein a plurality of gas compressor units is provided, wherein two gas compressor units are provided, wherein the two gas compressor units differ in construction and/or in the principle of operation.

3. The system as claimed in claim 1, wherein the pneumatically operable system component for operating the processing device comprises an element filling station and/or a tool changing station.

4. The system as claimed in claim 1, wherein a gas compressor unit is designed to supply pressurized air at different pressure levels.

5. The system as claimed in claim 1, wherein one gas compressor unit which operates according to the dynamic compressor principle is provided, and in that one gas compressor unit which operates according to the positive displacement principle is provided.

6. The system as claimed in claim 1, wherein the gas compressor unit is designed to supply a pressure level which is below a pressure level that is 0.3 bar above an initial pressure, or which is below a pressure level that is 0.2 bar above an initial pressure, or which is below a pressure level that is 0.1 bar above an initial pressure, wherein the gas compressor unit operates according to the positive displacement principle.

7. The system as claimed in claim 1, wherein the gas compressor unit is adapted to supply a system component arranged downstream of the gas compressor unit with a maximum system pressure level.

8. The system as claimed in claim 1, wherein the gas compressor unit is adapted to supply a system component arranged downstream of the gas compressor unit with a maximum system pressure level, wherein the pressure level can be adapted in a dynamically flexible manner during operation.

9. The system as claimed in claim 1, wherein the feed device has a gas compressor unit.

10. The system as claimed in claim 1, wherein the processing device has a gas compressor unit.

11. The system as claimed in claim 1, wherein the gas compressor unit has an electric drive.

12. The system as claimed in claim 1, wherein the gas compressor unit has a mechanical drive.

* * * * *